(12) United States Patent
Kusano

(10) Patent No.: US 7,565,256 B2
(45) Date of Patent: Jul. 21, 2009

(54) DISPLACEMENT DETECTING ENCODER

(75) Inventor: Kouhei Kusano, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 0 days.

(21) Appl. No.: 11/819,093

(22) Filed: Jun. 25, 2007

(65) Prior Publication Data

US 2008/0015805 A1 Jan. 17, 2008

(30) Foreign Application Priority Data

Jul. 3, 2006 (JP) ............................. 2006-183560

(51) Int. Cl.
*G06F 3/00* (2006.01)
(52) U.S. Cl. ....................... 702/117; 702/120; 702/179; 702/183
(58) Field of Classification Search ................. 702/105, 702/106, 150, 151, 161, 183, 182, 117, 120, 702/179; 250/231.16; 341/13; 356/494, 356/499; 375/340
See application file for complete search history.

(56) References Cited

U.S. PATENT DOCUMENTS

| 4,507,647 A | * | 3/1985 | Minami et al. ................. 341/13 |
| 4,733,069 A | | 3/1988 | Narutaki |
| 4,843,236 A | * | 6/1989 | Okutani ................... 250/231.1 |
| 5,418,362 A | | 5/1995 | Lusby et al. |
| 5,956,140 A | * | 9/1999 | Ishizuka et al. ............. 356/494 |
| 6,642,884 B2 | * | 11/2003 | Bryant et al. ............ 342/357.1 |
| 6,686,585 B2 | * | 2/2004 | Grimes et al. .......... 250/231.13 |
| 6,987,465 B2 | | 1/2006 | Mittmann |
| 7,053,362 B2 | * | 5/2006 | Tobiason et al. ........ 250/231.16 |
| 7,387,261 B2 | * | 6/2008 | Onishi ........................ 235/494 |

FOREIGN PATENT DOCUMENTS

EP 1 403 623 A1 3/2004

\* cited by examiner

*Primary Examiner*—Eliseo Ramos Feliciano
*Assistant Examiner*—Felix E Suarez
(74) *Attorney, Agent, or Firm*—Oliff & Berridge PLC

(57) ABSTRACT

A displacement detecting encoder including a scale having a positional code that contains positional information, a detection portion which is disposed so as to make a relative movement with respect to the scale and detect at least a part of the positional code equipped on the scale and a processing portion which processes a part of the positional code detected by the detection portion, thereby outputting the positional information, wherein the detected positional code is evaluated by positional code generating means for generating the positional code to detect the presence or absence of erroneous information. Thereby, an error in detecting a pseudo random code is detected by using a minimum code without addition of a redundant code and also correction can be made, thereby improving the reliability of generating ABS position signals.

3 Claims, 7 Drawing Sheets

{ Maximum Length pseudo random code

{ Maximum Length pseudo random code to be detected

DISPLACEMENT DETECTING ENCODER

CROSS-REFERENCE TO RELATED APPLICATION

The disclosure of Japanese Patent Application No. 2006-183560 filed on Jul. 3, 2006 including specifications, drawings and claims is incorporated herein by reference in its entirety.

BACKGROUND OF THE INVENTION

1. Field of the Invention

The present invention relates to a displacement detecting encoder and, in particular, to a displacement detecting encoder which is appropriately applicable to an absolute measurement type encoder using a pseudo random code and able to correct errors by using a minimum code without adding a redundant code.

2. Description of the Related Art

There is known a displacement detecting encoder (also referred to as an ABS encoder) for detecting an absolute (ABS) position by using a scale in which a grating corresponding to a pseudo random code as shown in the case of Maximum Length in FIG. 1 is formed as a detection pattern.

In the ABS encoder that uses a pseudo random code, such a problem is posed that dust and the like are attached on a scale to cause an error in detecting the pseudo random code, thereby reducing the reliability of generating ABS position signals.

In order to solve the above-described problem, Japanese Published Unexamined Patent Application No. 2001-296145 (Patent Document 1) has disclosed that detection codes read from a scale containing a redundant pattern are sequentially shifted to calculate absolute position data, and a possible occurrence of a reading error is judged with reference to whether each of the thus shifted and calculated absolute position data is continued.

Japanese Published Unexamined Patent Application No. 2004-117360 (Patent Document 2) has also disclosed that where there is found a decreased difference (corresponding to contrast of transmitted light) in analog scanning signals generated by scanning an interpolatory constituted region due to dirt and the like, such a result is not subjected to calculation.

However, the technology described in Patent Document 1 not only needs to add a redundant pattern but also needs to calculate absolute position data, while shifting detected code, thus resulting in a greater calculation load.

Further, the technology described in Patent Document 2 makes a judgment by referring only to the contrast of transmitted light, thus resulting in a lower accuracy of detecting errors.

Still further, the technologies described in Patent Documents 1 and 2 have a problem of only being able to detect an error but not being able to correct the error.

SUMMARY OF THE INVENTION

The present invention has been made to solve the above-described conventional problem, an object of which is to detect an error in detecting a pseudo random code by using a minimum code without addition of a redundant code and to allow for correction, thereby improving the reliability of generating ABS position signals.

The present invention is a displacement detecting encoder which is provided with a scale having a positional code containing positional information, a detection portion which is disposed so as to make a relative movement with respect to the scale and also able to detect at least a part of the positional code equipped on the scale, and a processing portion which processes a part of the positional code detected by this detection portion and outputs the positional information, in which the detected positional code is evaluated by positional code generating means for generating the positional code to detect the presence or absence of any erroneous information, thereby solving the above-described problem.

Where the detected positional code is in agreement with the positional code generated by the positional code generating means, a judgment is made that there is no error. Where it is not in agreement, a judgment is made that there is an error.

It is possible to detect the presence or absence of erroneous information with reference to a value of an error detecting bit defined on the basis of the positional code.

It is also possible to define a plurality of error detecting bits and to specify an error making bit with reference to values of the bits.

The positional code may contain a pseudo random code.

The positional code generating means may contain a formula for generating the pseudo random code.

The positional code generating means may have a corresponding table of positional information and positional codes.

On the basis of results for which the presence or absence of the erroneous information has been detected, the detected erroneous information can be deleted or corrected.

Incremental position detection means for increasing resolution can additionally be provided by interpolating the positional information detected by the positional code.

According to the present invention, the presence of an erroneous bit among detection codes can be detected by using a minimum code without addition of a redundant code. It is also possible to correct by specifying an erroneous bit in the detection code and also improve the reliability of generating ABS position signals.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals.

FIG. 1 is a view showing an example of an Maximum Length pseudo random code.

DETAILED DESCRIPTION OF THE PREFERRED EMBODIMENTS

Figure 2:
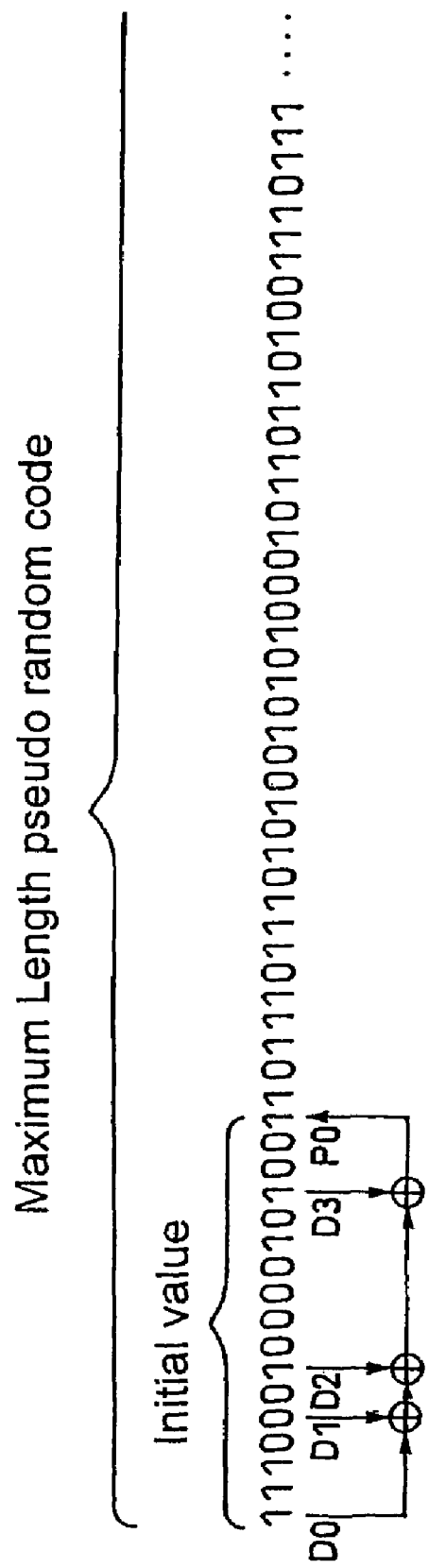
FIG. 2 is a view showing a method for generating the Maximum Length pseudo random code.

A detailed description will be made for embodiments of the present invention with reference to the drawings shown below.

First, a description will be made for a method for generating the Maximum Length pseudo random code with reference to FIG. 2.

Where an initial value is given as a 16-digit number of 1110001000010100, a tap position is placed on the first digit, fifth digit, seventh digit, and fourteenth digit, pseudo random number P0 is defined by the following formula.

$$P0 = D0 \text{ xor } D1 \text{ xor } D2 \text{ xor } D3 \quad (1)$$

In this formula, D0 is data of tap position 1, D1 is data of tap position 5, D2 is data of tap position 7 and D3 is data of tap position 14.

According to Data D0 to D3 respectively covering each of the tap positions 1, 5, 7, 14 and the formula (1), the 17th digit pseudo random number P0 is obtained.

Further, this calculation is repeated (in the case of FIG. 2, proceeding to the right), by which an Maximum Length pseudo random code illustrated in FIG. 2 is obtained. The thus obtained Maximum Length pseudo random code is arranged as a pattern on a scale 10 (exemplified by a transmissive type) as shown in FIG. 3.

Figure 3:
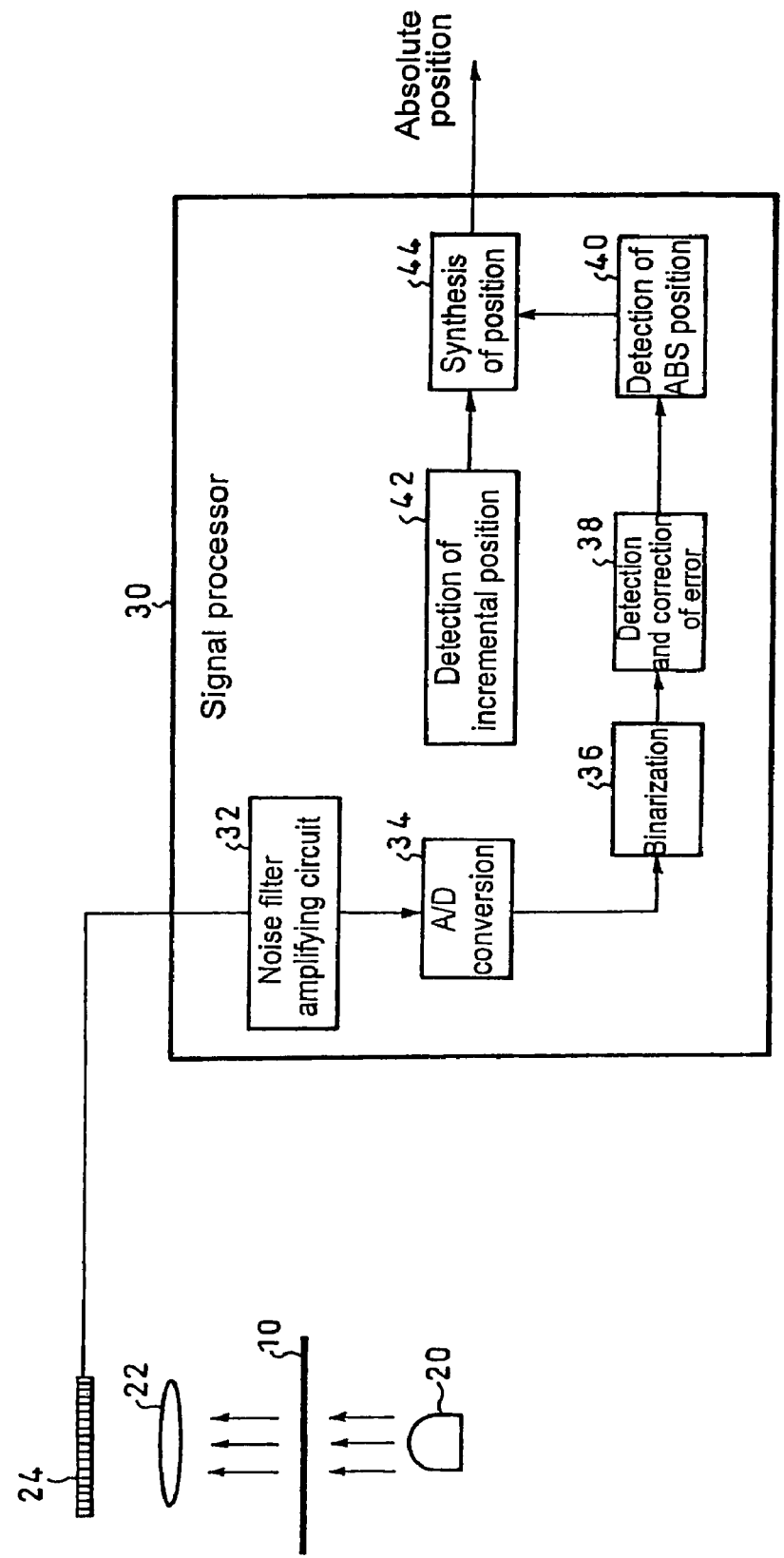
FIG. 3 is a view showing an embodiment of the apparatus for executing the present invention.

Then, a light emitting element 20 shown in FIG. 3 is used to illuminate the scale 10, and transmitted light is detected by a light receiving element array 24 capable of receiving light for 58 digits, for example, and the result is calculated by a signal processor 30 to obtain an absolute position.

The signal processor 30 is constituted with a noise filter amplifying circuit 32 in which, for example, signals obtained by sweeping output signals of a light receiving element array 24 along a direction of measurement axis are cut for high frequency noise by using a low pass filter and also amplified by a predetermined gain, an A/D conversion circuit 34 for converting analog signals output from the noise filter amplifying circuit 32 to digital signals for signal processing, a binary circuit 36 for binarizing an output of the A/D conversion circuit 34 by a predetermined threshold value, a detection/correction circuit 38 for detecting and correcting an error by using the formula (1) for generating a pseudo random code according to the present invention, an ABS position detection circuit 40 for detecting an ABS position by a correlation calculation of scale pattern design values and detected signals, an incremental position detection circuit 42 for detecting an incremental position by generating a 2-phase sine wave of 90-degree phase difference from a 4-phase sine wave of 90-degree phase difference (not illustrated) and making an arc tangent calculation for the purpose of interpolating the ABS position to increase the resolution, and a position synthesizing circuit 44 for outputting a high-resolution absolute position by interpolating an ABS position signal input from the ABS position detection circuit 40 by an incremental position signal input from the incremental position detection circuit 42.

A correlation function used in making a correlation calculation of the ABS position detection circuit 40 is subjected to either a difference calculus method or a multiplication method.

There is a case where an error detection may occur due to attachment of dust and the like on detecting a pattern on the scale 10 as shown in FIG. 2.

Therefore, in the present invention, a method for generating a pseudo random code is used to recalculate with respect to the detected pseudo random code. In other words, as shown in FIG. 4, where bits of a frame are recalculated, for example, upon detection of a 58-digit Maximum Length pseudo random code, data D0, D1, D2 and D3 respectively covering the tap positions 1, 5, 7, 14 are used to compare data calculated on the basis of the formula (1) with actual data P0 on the 17th digit.

Figure 4:
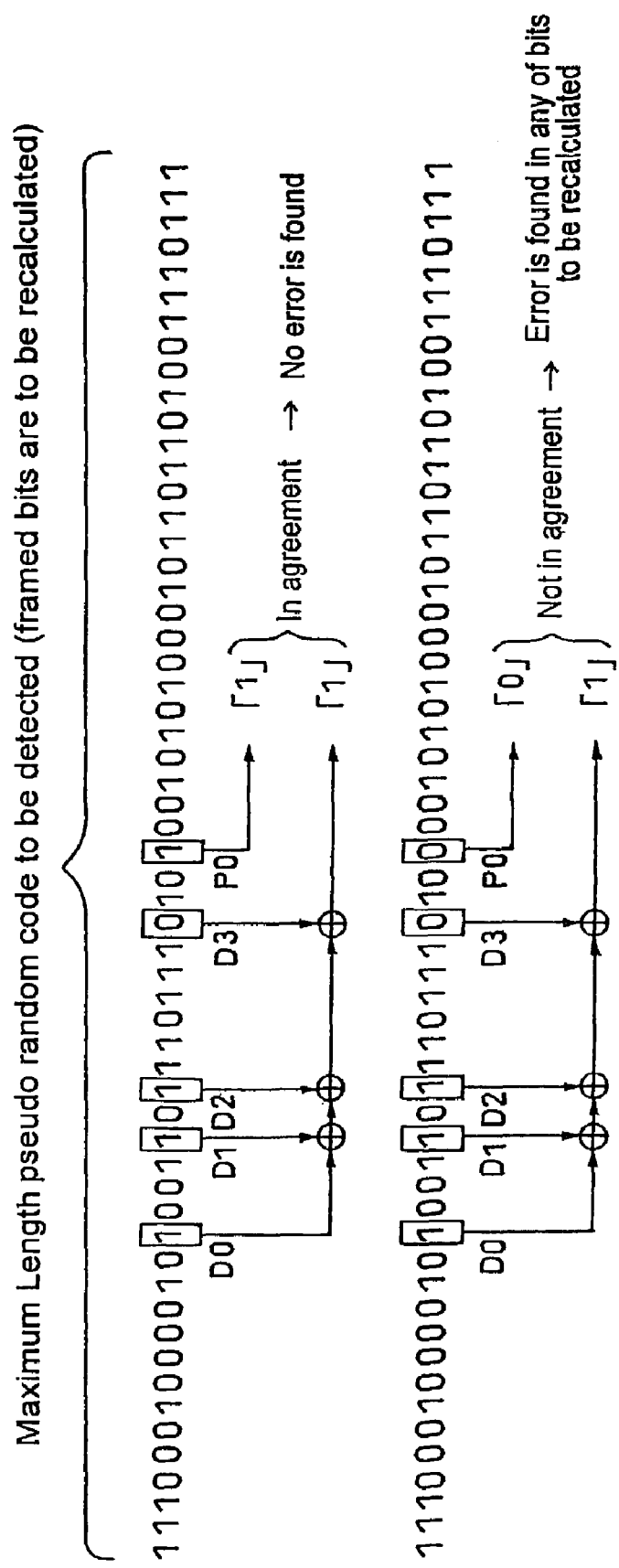
FIG. 4 is a view showing one method for recalculating the pseudo random code with reference to the present invention.

Then, as shown in the upper part of FIG. 4, where these two pieces of data are in agreement, a judgment is made that there is no error.

On the other hand, as shown in the lower part of FIG. 4, where the recalculated results are not in agreement, there is an error in any one of the bits to be recalculated, that is, D0, D1, D2, D3 or P0. Therefore, an error is corrected, or the result is not used in generating an ABS position signal.

Alternatively, it is possible to make recalculation by the following method. In this method, an error detecting bit E is defined with reference to the formula (1) as follows.

$$E = D0 \text{ xor } D1 \text{ xor } D2 \text{ xor } D3 \text{ xor } P0 \quad (2)$$

Figure 5:
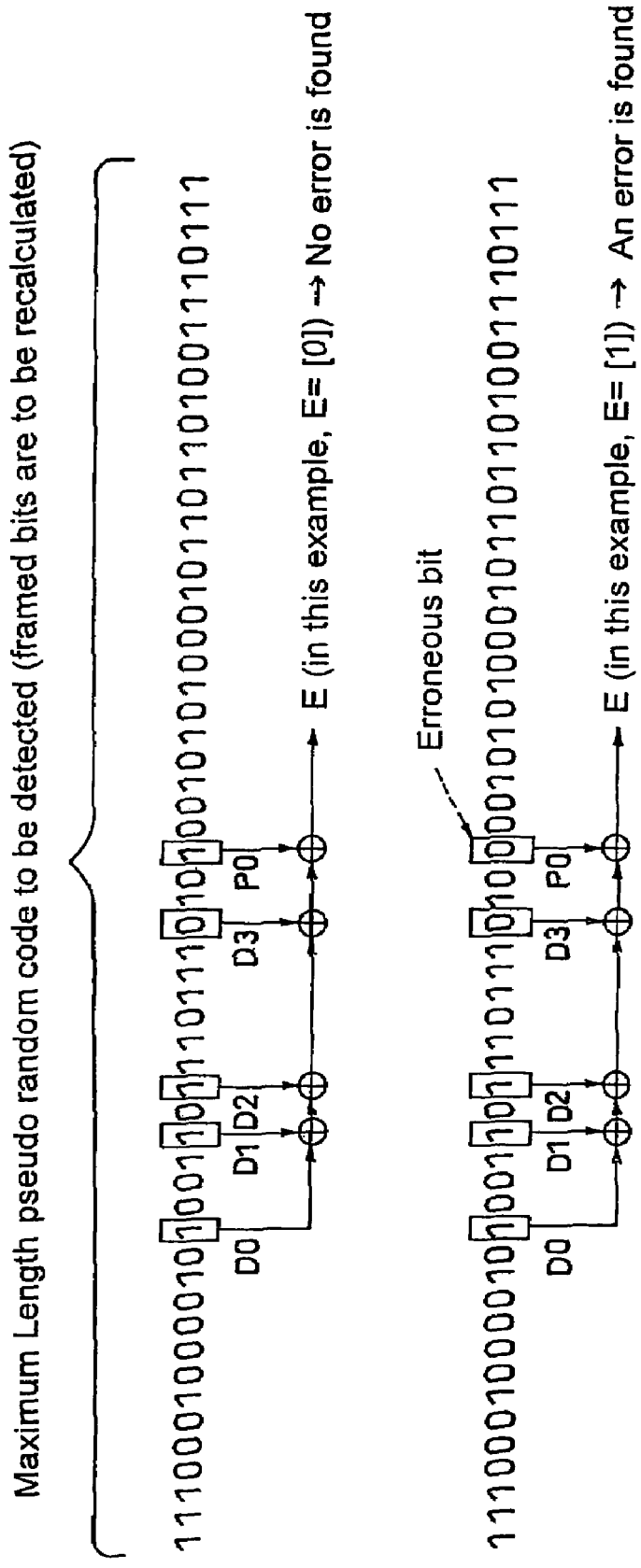
FIG. 5 is a view showing another method.

Then, as shown in the upper part of FIG. 5, where the error detecting bit E is 0, P0 is in agreement with the calculation result of the formula (1) to be 1 or 0. Therefore, a judgment is made that there is no error.

On the other hand, as shown in the lower part of FIG. 5, where the error detecting bit E is 1, an error exists in any of the bits to be recalculated. Therefore, the error is corrected, or the result is not used in generating an ABS position signal.

Further, although the presence of an error detecting bit can be found, the method shown in FIG. 4 or FIG. 5 is unable to specify an error making bit or make correction. Therefore, the following method is used to specify error making bits.

Figure 6:
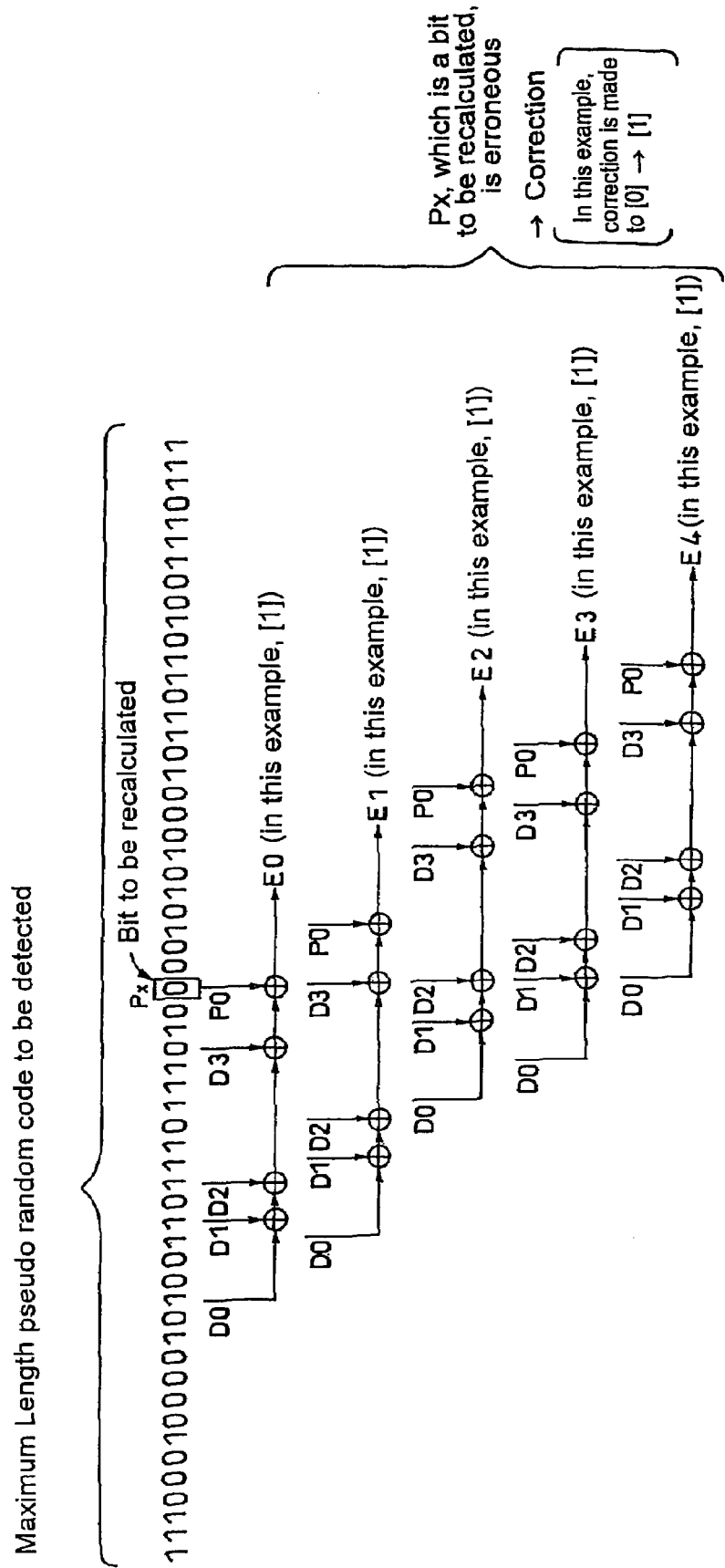
FIG. 6 is a view showing a method for correcting a detection error.

More specifically, in order to correct a detection error, it is necessary to detect at which bit an error occurs. Therefore, the error detecting bits of E0 to E4 are defined with respect to the bits to be recalculated in FIG. 6.

Then, where the error detecting bits of E0 to E4 are all to be given as 1, a bit to be recalculated Px is found to be erroneous. Therefore, the bit to be recalculated Px is corrected for the value. In this case, the bit to be recalculated Px in the drawing is corrected from 0 to 1.

In the embodiments described above, an error is detected and corrected on the basis of calculation results obtained by using the above calculation formula. Alternatively, a combination of detection bits at each position is calculated in advance by using the above formula, and the combination of detection bits and positional information are given as a set, which may be stored in a corresponding table. Then, the thus detected detection position bits are used to detect an error with reference to the corresponding table, by which the necessity for making a calculation processing can be eliminated to speed up error detection and correction.

Figure 7:
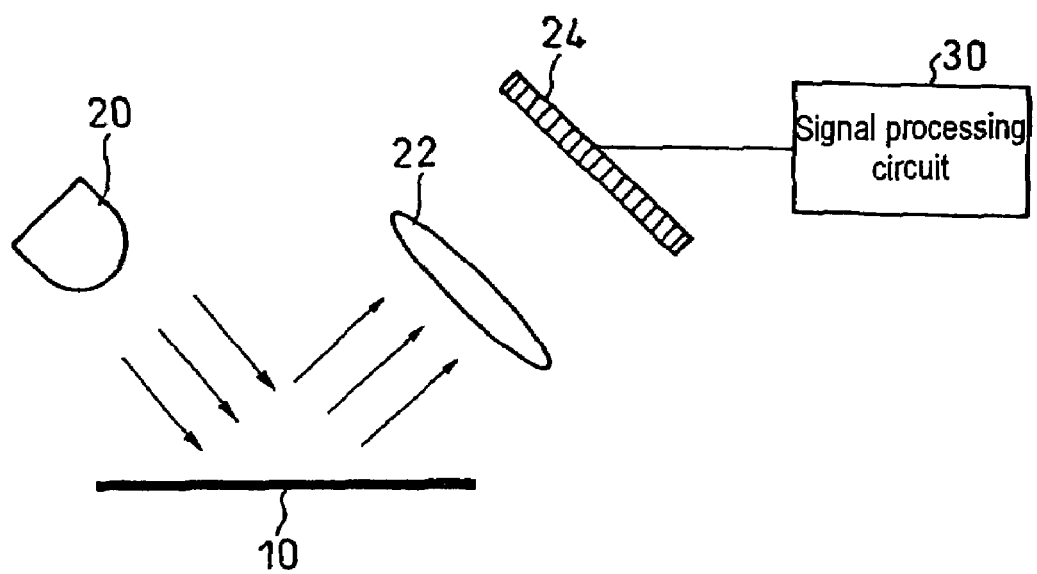
FIG. 7 is a view showing an exemplified variation of the apparatus.

Further, in the embodiments described above, the present invention is applied to a transmissive type scale. The present invention is not restricted thereto, and is similarly applicable to a reflective type scale as shown in FIG. 7. Types of pseudo random codes are not restricted to Maximum Length. Similarly, the number of rows of initial values, tap positions and number of digits of detection codes are not restricted to those described in the embodiments.

Where a high resolution is not required, it is also possible to omit the detection of an incremental position and carry out only the detection of the ABS position.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A displacement detecting encoder comprising:

a scale having a positional code comprising a maximum length pseudo random code, wherein a pseudo random number P0 of a predetermined digit is calculated by a formula P0=D0 xor D1 xor D2 xor D3, wherein D0-D3 are data of tap positions;

a detection portion which is disposed so as to make a relative movement with respect to the scale and detect at least a part of the positional code provided on the scale;

a processing portion which processes a part of the positional code detected by the detection portion, thereby outputting the positional information; and a positional code generating means for generating the pseudo random number P0 of the predetermined digit based on the formula, wherein a judgment is made that there is no error where the detected pseudo random number P0 is in agreement with the pseudo random number P0 generated by the positional code generating means, and wherein when the detected pseudo random number P0 is not in agreement with the pseudo random number P0 generated by the positional code generating means, an error making bit is specified with reference to values of a plurality of error detecting bits E0-E4 defined by a formula E=D0 xor D1 xor D2 xor D3 xor P0, detected erroneous information of the error making bit is corrected, and absolute position is measured using corrected data.

2. The displacement detecting encoder of claim 1, wherein the positional code generating means is provided with a corresponding table of positional information and positional codes.

3. The displacement detecting encoder of claim 1, further comprising an incremental position detection means for interpolating positional information detected by the positional code to increase resolution.

* * * * *